United States Patent Office 3,411,350
Patented Nov. 19, 1968

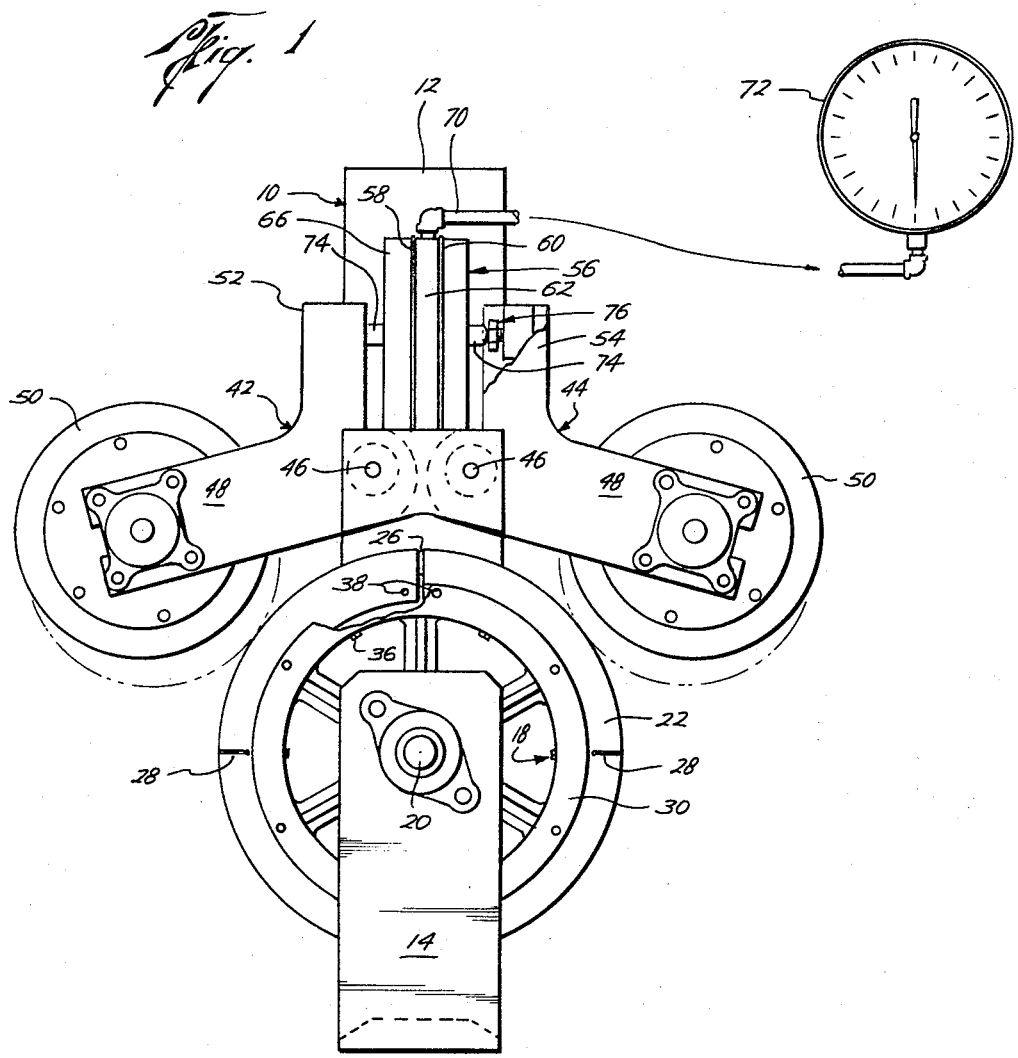

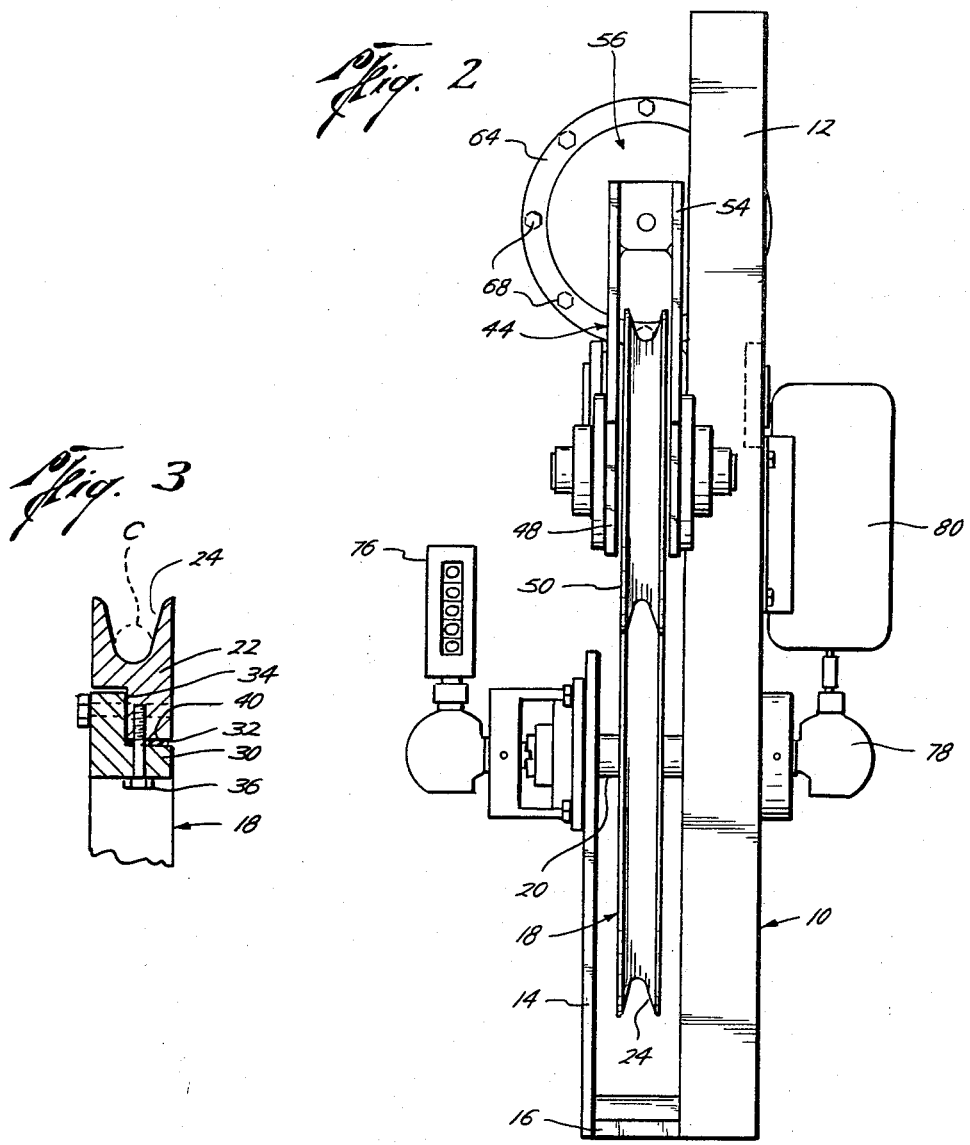

3,411,350
CABLE LENGTH AND TENSION
INDICATING APPARATUS
Martin T. Sokolosky, 3703 Underwood,
Houston, Tex., 77025
Filed Jan. 16, 1967, Ser. No. 609,569
7 Claims. (Cl. 73—144)

ABSTRACT OF THE DISCLOSURE

Cable length and tension measuring apparatus of the measuring wheel type including means for adapting such apparatus for use with cables of different diameters while maintaining accurate length measurement and indicating the tension on the cable.

---

Cable length measuring apparatus of the measuring wheel type, as heretofore commonly constructed, is provided with a peripherally grooved wheel or pulley of accurately predetermined circumference with which the cable is engaged to rotate the wheel as the cable moves longitudinally in contact therewith to measure the length of cable which is paid out or taken in.

In order to assure accuracy of measurement the cable is fitted closely to the groove of the wheel in contact with the bottom of the groove. In the event that a cable of larger diameter is used the cable will not be in contact with the bottom of the groove but will engage the sides of the groove in radially spaced relation to the bottom, thus increasing the length of cable which is measured by the wheel and greatly reducing the accuracy of the apparatus. A separate wheel is usually provided for each different size of cable to be employed in order to assure accuracy of measurement, making it necessary to change the wheel each time that a different size of cable is to be used.

Cable measuring apparatus of this type is also provided with means for indicating the tension which is applied to the cable, such means usually taking the form of pulleys movably mounted for movement toward and away from the wheel and means yieldably urging the pulleys toward the wheel in engagement with the cable at longitudinally spaced locations thereon, to hold the cable in a flexed condition in engagement with a portion of the periphery of the wheel, so that the pulleys move away from the wheel in response to an increase in the tension on the cable and toward the wheel in response to a decrease in such tension. Means is also provided which is designed for coaction with the pulleys to indicate the tension on the cable.

The present invention has for an important object the provision of cable length and tension measuring apparatus of the measuring wheel type embodying means for adapting such apparatus for use with cables of different diameters.

Another object of the invention is to provide cable lenght and tension indicating apparatus of the type referred to which is designed to greately facilitate the removal and replacement of the cable or the substitution of a cable of different size therein.

A further object of the invention is the provision in cable length and tension indicating apparatus of the kind mentioned, of means for adjusting the effective diameter of the measuring wheel to adjust the accuracy of measurement.

Another object of the invention is the provision in cable length and tension apparatus of the type referred to of tension indicating mechanism which is hydraulically operated and which is adjustable for accurate calibration.

Briefly described the apparatus of the invention comprises, a peripherally grooved, rotatably mounted, measuring wheel, rotatable pulleys movably mounted in the plane of the wheel for bodily movement toward and away from the periphery of the wheel in engagement with the cable at locations to hold the cable in a flexed condition in engagement with the wheel in the groove, and yieldable means positioned for coaction with the pulleys to yieldingly urge the pulleys toward the wheel. The apparatus also includes indicator means responsive to the bodily movements of the pulleys in response to changes in the tension on the cable for indicating the tension exerted thereon. The length measuring mechanism of the apparatus includes means for indicating the amount of rotational movement of the measuring wheel.

The construction and mode of operation of the invention will best be understood from the following detailed description of a preferred embodiment of the same, reference being had to the annexed drawings, wherein, FIGURE 1 is a side elevational view of the apparatus of the invention;

FIGURE 2 is an end elevational view of the same; and

FIGURE 3 is a radial cross-sectional view, on an enlarged scale, of the rim portion of the measuring wheel of the apparatus showing details of construction of the same and illustrating the manner in which the removable rim of the wheel is releasably secured in position and adjusted thereon.

Referring now to the drawings in greater detail the apparatus includes a rigid supporting frame generally designated 10 having a relatively massive base portion 12 and a support arm 14 located in parallel spaced relation thereto and connected to one end of the base by a connecting portion 16, to form a generally U-shaped structure of which the base 10 is the longer arm and the arm 14 is the shorter arm.

A measuring wheel, generally designated 18 is rotatably supported on a shaft 20 extending between and supported on the free end portion of the arm 14 and the base 12. The wheel has a removable rim member 22 releasably mounted thereon which is formed with a peripheral, cable groove 24.

The rim member is of substantially circular shape, taking the form of a split ring, cut through radially, as seen at 26 in FIGURE 1, and also having radially inwardly extending slots or notches 28, which may be conveniently located at 90° intervals about the periphery of the member, to render the member somewhat flexible, whereby the member may be readily fitted on the rim of the wheel.

The rim 30 of the wheel may be shaped to form a peripheral seat 32 and a shoulder 34 extending radially outwardly beyond the seat, and the rim member 22 may be shaped to seat on the seat 32 in abutment with the shoulder 34 as shown in FIGURE 3. The rim member 22 may be releasably secured to the rim 30, as by means of bolts 36 and 38. For the purpose of adjusting the rim member on the wheel, so that the length of the cable measured by the wheel may be accurately adjusted, the bolts 38 may have a certain amount of loose play to allow some radial movement of the member relative to the rim 30, so that the member may be slightly expanded or contracted by adjustment of the bolts 36 to regulate the length of the periphery of the member, such expansion or contraction being allowed by the split 26 and the notches or slits 28. Suitable means, such as sheet metal shims, indicated at 40, may be inserted between the rim 30 and member 32 on the seat 32 to securely hold the member in its adjusted position.

By this construction rim members having variously shaped grooves to fit cables of different diameters may be provided, which may be interchanged on the rim 30 so that the wheel may be accommodated for accurate measurement when used with cables of different diameters. The grooves of such rim members may be of such shape and depth that the effective measuring diameter of the wheel may be adjusted to measure the same length of cables of different diameters when the rim members are accurately adjusted on the wheel. The provision of rim members of this kind also greatly facilitates the removal and replacement of the members and their accurate adjustment without the necessity of dismantling the equipment when changing from one size of cable to another.

The tension mechanism of the apparatus includes pivotally mounted levers or bell cranks 42 and 44, pivotally mounted on pins 46 on the base 12, and each having an arm 48 upon which a grooved pulley 50 is rotatably mounted at a location to engage the cable to hold the cable in contact with the wheel 18. The lever 42 has another arm 52 and the lever 44 has a similar arm 54, between which arms a diaphragm casing 56 is disposed, within which there is a diaphragm chamber containing spaced apart flexible diaphragms 58 and 60. The casing 56 may conveniently be formed with a central, ring like part 62 positioned between the diaphragms and outer parts 64 and 66 one at each side of the part 62 in contact with the diaphragms to clamp the diaphragms in the casing. The parts 62, 64 and 66 may be secured together in any convenient manner, as by bolts 68. The chamber formed within the ring 62 between the diaphragms is filled with a suitable liquid, such as oil, and a pipe 70 leads from the interior of the oil chamber to a pressure gauge 72 by which the pressure of the liquid may be indicated.

The diaphragms have central pins or lugs 74 against which the arms 52, 54 press to flex the diaphragms toward each other in response to movements of the pulleys 50 away from the wheel 18 to apply pressure to the fluid between the diaphragms upon an increase in the tension on the cable, which will thus be indicated on the meter 72.

An adjusting screw 76 may be provided between the arm 54 and its pin 74 by which the diaphragm mechanism may be adjusted for the purpose of calibrating the tension indicator.

In making use of the length and tension indicating apparatus constructed as described above, a cable is extended between the pulleys 50 and wheel 18, in the groove 24 of the wheel, as indicated at C in FIGURE 3, the cable being held in a somewhat flexed condition along a portion of the periphery of the wheel by the pulleys 50, so that upon an increase in the tension on the cable the cable will tend to straighten, thus moving the pulleys 50 away from the wheel to actuate the levers 42 and 44 to exert an increased pressure on the diaphragms 58 and 60, which will be indicated by the meter 72.

It will be noted that the cable C is in contact with the wheel 18 in the bottom of the groove 24, so that the length of cable which is paid out or taken in will be measured by the rotation of the wheel. Suitable counter mechanism, such as that shown at 76 in FIGURE 1, may be carried on the support arm 14, and connected to the shaft 20 to be driven by rotation of the wheel to indicate the length of cable which has been measured thereby. The shaft 20 may also be connected to suitable mechanism, such as the right angle gear drive indicated at 78 which in turn operates, electrical mechanism, or the like, of any conventional type, shown at 80, by which the length of cable measured may be indicated at some location remote from the apparatus, should this be desired.

In the event that the apparatus is to be used with a cable of larger diameter than the cable C, the rim member 22 is removed and replaced by a rim member having a groove which fits the larger cable, so that the new cable will be in engagement with the bottom of the groove, and the effective diameter of the wheel is thus adjusted to correctly measure the length of the large cable. The rim member may, of course, be adjusted by the bolts 36 and the use of shims 40 to somewhat expand or contract the rim member to exactly adjust the length of the periphery of the wheel for purposes of calibration.

The cable can be readily removed and replaced by merely slackening the cable and slipping the cable out from between the pulleys and the wheel and inserting the new cable by a similar procedure, without otherwise disassembling or dismantling the apparatus.

The invention thus provides length and tension indicating mechanism for cables, wire lines, or the like, which is accurate in use and which may be easily adjusted for use with cables of widely differing sizes.

The invention is disclosed herein in connection with a particular embodiment of the apparatus, which is intended by way of illustration only, it being understood that various changes can be made in the construction and arrangement of hte parts within the spirit of the invention and the scope of the appended claims.

Having thus clearly shown and described the invention, what is claimed as new and desired to secure by Letters Patent is:

1. Cable length and tension measuring apparatus comprising
   (a) a supporting frame,
   (b) a peripherally grooved measuring wheel rotatably mounted on the frame,
   (c) bell crank levers rotatably mounted on the frame and having,
   (d) arms positioned for movement toward and away from the wheel and
   (e) other arms movable toward and away from each other,
   (f) a pulley rotatably mounted on each of the first named arms for swinging movement therewith in the plane of the wheel at locations for engagement with a cable passing over the wheel in the groove thereof to flex the cable longitudinally in engagement with the periphery of the wheel, said first named arms being movable away from the wheel upon an increase in the tension on said cable to move said other arms toward each other, and
   (g) tension indicating means positioned for coaction with said other arms upon movement of said other arms toward each other to indicate the tension on said cable.

2. The cable length and tension measuring apparatus as claimed in claim 1 wherein said measuring wheel includes
   (h) an inner circular rim portion,
   (i) an expansible split ring shaped rim member seated on said rim portion, and
   (k) means positioned for coaction with said rim portion and member to hold the member in a predetermined position of expansion on the wheel.

3. The cable length and tension measuring apparatus as claimed in claim 2, wherein said rim member is formed with
   (i′) peripherally spaced, radially extending slots extending partially through the element from one peripheral face thereof to increase the flexibility of the element.

4. The cable length and tension measuring apparatus as claimed in claim 1 wherein said tension indicating means comprises,
   (l) means forming a pressure fluid chamber and,
   (m) means for causing an increase in the pressure in said chamber upon movement of said other arms toward each other.

5. The cable length and tension measuring apparatus as claimed in claim 1, including
   (n) means responsive to rotation of said wheel for indicating the length of cable measured by such rotation.

6. The cable length and tension measuring apparatus as claimed in claim 2, wherein said inner circular rim portion is formed with (h') a cylindrical surface portion and
(h") a peripherally extending face extending radially outwardly from said cylindrical surface portion in a plane perpendicular to the axis of said wheel,
(i") said rim member being shaped to seat against said radially extending face, and including,
(o) means positioned for coaction with said rim portion and member to hold the member in predetermined spaced relation to said surface portion.

7. The cable length and tension measuring apparatus as claimed in claim 4 including
(p) means responsive to an increase in the pressure of fluid in said chamber for indicating the tension on said cable.

References Cited

UNITED STATES PATENTS

| | | | |
|---|---|---|---|
| 1,726,507 | 8/1929 | Tidball | 74—230.5 |
| 2,121,870 | 6/1938 | Greene | 33—134 XR |
| 2,269,573 | 1/1942 | Barry | 33—129 |
| 2,328,658 | 9/1943 | Mathey | 73—144 |
| 2,963,145 | 12/1960 | Bruestle | 74—230.5 |

RICHARD C. QUEISSER, *Primary Examiner.*

CHARLES A. RUEHL, *Assistant Examiner.*